Patented Apr. 19, 1938

2,114,393

UNITED STATES PATENT OFFICE 2,114,393

GREASEPROOF IMPREGNATED ARTICLE AND METHOD OF PREPARING

Fred H. Lane, Hillsdale, N. Y., assignor to Hercules Powder Company, Wilmington, Del., a corporation of Delaware No Drawing. Application April 3, 1936, Serial No. 72,537

6 Claims. (Cl. 91—68)

This invention relates to impregnated porous materials impervious to fats, greases, oils, and petroleum hydrocarbons, and to the method of manufacture thereof.

Heretofore, many attempts have been made to prepare impregnated materials proof against the penetration of fats, greases, oils and light petroleum hydrocarbons, with retention of the flexibility of the impregnated material. For example, felt, paper, cardboard, and the like has been impregnated with rubber, cellulose nitrate, cellulose acetate, resins, and the like, all of which are relatively expensive, but all have suffered from the disadvantage that they were penetrated or dissolved by petroleum greases, oils, and light petroleum hydrocarbons.

Also, many attempts have been made heretofore to prepare impregnated materials proof against penetration by fats, greases, oils and light petroleum hydrocarbons, by impregnating porous substances with physical mixtures, such as shellac and castor oil. However, when these impregnated articles are maintained at elevated temperatures for a considerable length of time, separation of the ingredients occurs, the shellac precipitates and the castor oil sweats out, with consequent loss of the oil and grease-proof properties of the materials.

Attempts have also been made to use as the saturant of porous materials the substance known to the trade as Vinsol resin (trade-mark registered, No. 303,219, by Hercules Powder Company), which is, broadly speaking, a gasoline-insoluble resin obtained, for example, from pine wood by extraction of comminuted pine wood by a coal tar hydrocarbon, removal of the volatile substances from such extract to produce a mixture of solid resins, extracting such solid resin mixture by a volatile paraffin hydrocarbon to remove rosin from said resin mixture, and recovering a paraffin hydrocarbon-insoluble resin substantially free from rosin, all as is more fully described and claimed in application for United States Letters Patent, Serial No. 61,745, filed January 31, 1936 by Lucius C. Hall. However, the above-described resin is hard and brittle, incompatible with softening agents, of an acid reaction, and renders the saturated, porous articles hard and brittle, instead of soft and pliable, as is desired.

I have found that, by the use of a saturant comprising esters of the resin known to the trade as Vinsol, as hereinafter described, I obtain impregnated articles proof against oils, greases, hydrocarbons, etc., and at the same time retain flexibility of the impregnated article, rendering such impregnated article highly desirable to the trade.

The resin known as Vinsol resin may be reacted or esterified with polyhydric alcohols, e. g. ethylene glycol, propylene glycol, di-ethylene glycol, glycerol, pentaerythritol, etc., to produce esters which are substantially neutral, and which, surprisingly, retain the same high di-electric strength and resistance to oils, greases and hydrocarbons as that possessed by the unesterified resin. Fatty acids of gylcerides may be included in the esterification, to form modified esters of varying degrees of mobility, and at the same time possess a high degree of pliability and retain the oil-resistance, insolubility and high dielectric strength of the unesterified resin. The resin and the polyhydric alcohol may be reacted in widely varying proportions, but ordinarily the amount of polyhydric alcohol employed will be at least equal to that required for complete chemical combination with the resin, and will preferably be in excess of the exact combining weight by 10 to 200%. The polyhydric alcohol may be added to the resin all in one portion at the start of the reaction, or in several portions during the reaction, as desired.

The reaction of the resin and the polyhydric alcohol will be carried out in the presence of heat, the temperature range employed varying with the particular polyhydric alcohol used, but generally within the range of about 100° C. to about 300° C., preferably 200° C. to 300° C. If desired, the reaction may be conducted in an autoclave to prevent escape of the polyhydric alcohol, and, if desired, esterification catalysts, as hydrochloric acid, sulfuric acid, p-toluene sulfonic acid, etc., may be used.

After the reaction is completed, which may require from 5 to 50 hours, depending upon the conditions, the polyhydric alcohol used, etc., any excess polyhydric alcohol present may be removed by subjecting the mass to distillation, preferably under vacuum.

Thus, by the use of the resin and glycerol, I obtain a product having an acid no. of 35, a melting point (drop method) 154.5° C., a gasoline insolubility of 93.3%, a petroleum ether insolubility of 99.0%. By the use of ethylene glycol and the resin I obtain a product having an acid no. of 35, a melting point (drop method) of 124° C., and a gasoline insolubility of 96.9%. By the use of di-ethylene glycol and resin I obtain a product having an acid no. of 15, a melting point (drop method) of 117° C., and a gasoline insolubility of 98.5%. By the use of tri-ethylene glycol and the resin I obtain a product having an acid no. of 16, a melting point (drop method) of 113.5° C., and a gasoline-insolubility of 98.4%. By the use of the resin and di-ethylene glycol and castor oil, I obtain a product having an acid no. of 23.5, a melting point (drop method) of 72° C., and a gasoline-insolubility of 98.8%. Similarly, use of the resin and ethylene glycol and soya bean oil produced a resin having an acid no. of 22, a melting point (drop method) of 73.5° C., and a gasoline-insolubility of 93.2%.

The resin esters of the class hereinbefore described, while substantially insoluble in petroleum hydrocarbons, are readily soluble in acetone, toluene, benzene, hydrogenated petroleum cuts (Solvesso), and the like.

In practicing my invention, I take any suitable porous material, e. g. paper, cardboard, felt, cloth, sheet pulp, pulp board, flannel, etc., and thoroughly impregnate it with the esterified resin in a molten state or in solution in a solvent, and then allow the impregnated material to cool or remove the solvent, if solvent be used. For example, I may thus impregnate a felt washer, and render the washer oil-resistant and flexible, for use in oil lines, electric transformers, gasoline pumps, oil retainers for automobile axles, etc. Again, I may impregnate a formed, flannel box toe with the resin ester, to give it strength to hold its shape, yet be somewhat resilient, but not brittle, as are box toes made with various resins. Again, I may impregnate cotton tape with the resin ester, thus forming an insulating tape for electrical work, since the tape so impregnated has a high di-electric strength, is flexible, and maintains its flexibility at high temperatures. Again, I may impregnate with the resin ester strips or sheets of paper or cloth, thus forming electrical insulating material for use in coil winding for motor and transformers.

What I claim and desire to protect by Letters Patent is:

1. Porous, fibrous material impregnated with a resin comprising esterified pine wood resin produced by extracting resinous wood with a coal tar hydrocarbon, removing said hydrocarbon by evaporation, extracting the residue with a petroleum hydrocarbon, and recovering a gasoline-insoluble resin.

2. Porous, fibrous material impregnated with a high di-electric strength, non-sweating resin comprising esterified pine wood resin produced by extracting resinous wood with a coal tar hydrocarbon, removing said hydrocarbon by evaporation, extracting the residue with a petroleum hydrocarbon, and recovering a gasoline-insoluble resin.

3. Porous, fibrous material impregnated with the product of the reaction of a polyhydric alcohol and a pine wood resin produced by extracting resinous wood with a coal tar hydrocarbon, removing said hydrocarbon by evaporation, extracting the residue with a petroleum hydrocarbon, and recovering a gasoline-insoluble resin.

4. Porous, fibrous material impregnated with the product of the reaction of a polyhydric alcohol, a glyceride, and a pine wood resin produced by extracting resinous wood with a coal tar hydrocarbon, removing said hydrocarbon by evaporation, extracting the residue with a petroleum hydrocarbon, and recovering a gasoline-insoluble resin.

5. Method of preparation of oil- and grease-proof materials comprising reacting in the heat a pine wood resin produced by extracting resinous wood with a coal tar hydrocarbon, removing said hydrocarbon by evaporation, extracting the residue with a petroleum hydrocarbon, and recovering a gasoline-insoluble resin, and a polyhydric alcohol, and impregnating a porous, fibrous material therewith.

6. Method of preparation of oil- and grease-proof materials comprising reacting in the heat a pine wood resin produced by extracting resinous wood with a coal tar hydrocarbon, removing said hydrocarbon by evaporation, extracting the residue with a petroleum hydrocarbon, and recovering a gasoline-insoluble resin, a polyhydric alcohol, and a glyceride, and impregnating a porous, fibrous material therewith.

FRED H. LANE.